United States Patent
Scarr

(10) Patent No.: US 9,898,540 B1
(45) Date of Patent: Feb. 20, 2018

(54) METHOD FOR AUTOMATED CATEGORIZATION OF KEYWORD DATA

(71) Applicant: Stephen Scarr, Chicago, IL (US)

(72) Inventor: Stephen Scarr, Chicago, IL (US)

(*) Notice: Subject to any disclaimer, the term of this patent is extended or adjusted under 35 U.S.C. 154(b) by 307 days.

(21) Appl. No.: 14/874,426

(22) Filed: Oct. 3, 2015

Related U.S. Application Data

(60) Provisional application No. 62/059,325, filed on Oct. 3, 2014.

(51) Int. Cl.
*G06F 17/30* (2006.01)
*G06N 99/00* (2010.01)

(52) U.S. Cl.
CPC .. *G06F 17/30873* (2013.01); *G06F 17/30684* (2013.01); *G06F 17/30707* (2013.01); *G06F 17/30887* (2013.01); *G06F 17/30958* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 8,078,625 B1* | 12/2011 | Zhang | G06F 17/30707 707/748 |
| 2014/0258261 A1* | 9/2014 | Singh | G06F 17/3087 707/709 |

\* cited by examiner

*Primary Examiner* — Anh Tai Tran
(74) *Attorney, Agent, or Firm* — Bruce E. Weir

(57) ABSTRACT

A method for categorizing text strings assigns text strings to topical categories. A search engines retrieves and ranks a list of Uniform Resource Locators (URLs) for each test string. The most highly-ranked URLs for a set of text strings form a whitelist of pre-approved text strings that are assumed to correlate closely with category meaning. Incorrectly categorized text strings are identified by scoring a list of URLs retrieved by a search engine for each text string, comparing each score to the whitelist position of the text string, flagging text strings with scores that deviate from whitelist position by at least a threshold amount, and reassigning flagged text strings to categories with the most similar sets of retrieved URLs.

1 Claim, 2 Drawing Sheets

METHOD FOR AUTOMATED CATEGORIZATION OF KEYWORD DATA

CROSS-REFERENCE TO RELATED APPLICATION

This application claims the benefit of U.S. provisional patent application Ser. No. 62/059,325, filed by the same inventor on Oct. 3, 2014, hereby incorporated by reference in its entirety.

BACKGROUND

In the field of automated algorithmic classification of text strings into topical hierarchies or ontologies, there is a need to quickly identify incorrect categorizations and to provide a path for improvement. Being able to rapidly analyze and improve a large dataset of classified text with limited manual intervention allows for quick release of updated datasets, and can identify and correct errors before they manifest in applications that may rely them.

Collaborative filtering solutions require observation of usage patterns over a period of time. What is needed is a method by which large datasets may be quickly tested and text strings that are poorly classified are quickly identified and correctly categorized.

SUMMARY

A method for categorizing text strings employs humans to create categories of meaning and audit training sets of text strings assigned to those categories. One or more search engines are then used to retrieve and rank a list of Uniform Resource Locators (URLs) for each training set test string. The most highly-ranked URLs for a set of text strings form a whitelist of pre-approved text strings that are assumed to correlate closely with category meaning.

Incorrectly categorized text strings may be identified by scoring a list of URLs retrieved by a search engine for each text string, comparing each score to the whitelist position of the text string, flagging text strings with scores that deviate from whitelist position by at least a threshold amount, and reassigning flagged text strings to categories with the most similar sets of retrieved URLs.

A new, unknown text string may be efficiently and accurately categorized by using one or more horizontal search engines to generate a list of returned URLs for the text string. A score is assigned to each URL, and the text string is assigned to the category with the most similar URL whitelist.

DETAILED DESCRIPTION

Figure 1:
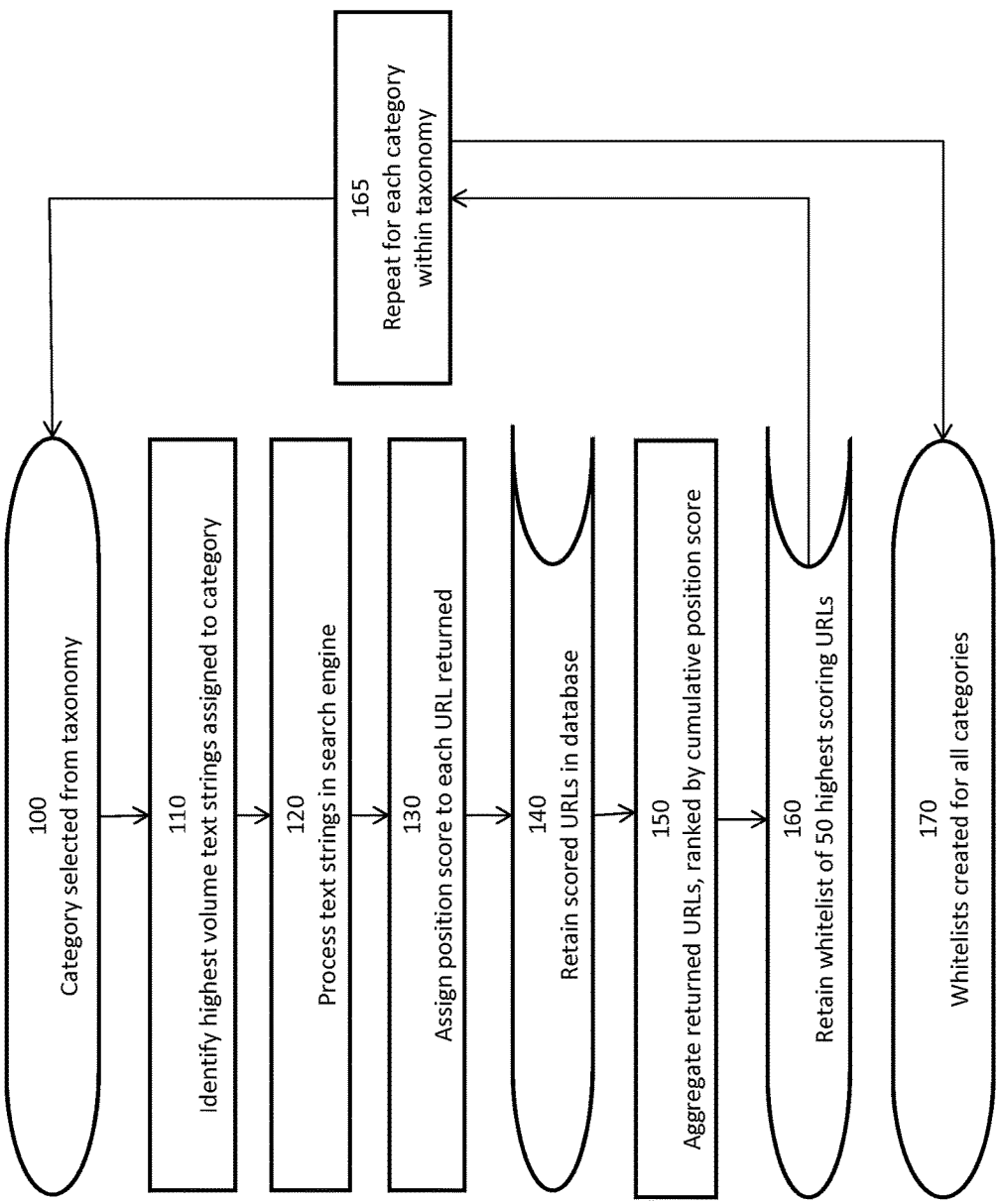
FIG. 1 is a processing flow diagram showing a method for creating whitelists of closely related URLs.

In the Summary above and in the Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number) (a second number)," this means a range whose lower limit is the first number and whose upper limit is the second number. For example, 25 to 100 mm means a range whose lower limit is 25 mm, and whose upper limit is 100 mm.

Accurate categorization of keywords by meaning can effect substantial improvements in the usefulness of search engine results. Although automated systems may excel at making rapid and accurate comparisons between keywords and other text strings, such systems have had at best limited success at recognizing the meanings attributed to text strings by human beings. Human evaluation of large volumes of text strings is a slow and expensive process.

The combined speed and accuracy of text string categorization may be substantially improved by a method that employs humans to create categories of meaning and audit a training set of text strings assigned to those categories. One or more search engines such as Google, Bing and/or other search engines known in the art are then used to retrieve and rank a list of Uniform Resource Locators (URLs) for each training set test string. The most highly-ranked URLs for a set of text strings form a whitelist of pre-approved text strings that are assumed to correlate closely with category meaning.

Incorrectly categorized text strings may be identified by scoring a list of URLs retrieved by a search engine for each text string, comparing each score to the whitelist position of the text string, flagging text strings with scores that deviate from whitelist position by at least a threshold amount, and reassigning flagged text strings to categories with the most similar sets of retrieved URLs.

A new, unknown text string may be efficiently and accurately categorized by using one or more horizontal search engines to generate a list of returned URLs for the text string. A score is assigned to each URL, and the text string is assigned to the category with the most similar URL whitelist.

A preferred embodiment of the invention utilizes over 450,000 hierarchical categories that together encompass the entire commercial and social internet. A dataset of text strings is processed by an automated system using human-created vocabulary rules to assign to assign each text string to one category, creating a training set of text strings for each category. The vocabulary rules may include positive and negative filter words that allow or prevent assignment of a text string to a category. In the preferred embodiment each training set comprises the lesser of the top 25% of text strings or the top 500 text strings assigned to the category, ranked in descending order by volume.

Each text string training set is processed by one or more horizontal search engines to create a whitelist. FIG. 1 is a processing flow diagram showing a method for creating a whitelist. A category is selected 100 for processing and the highest volume text strings from the training set assigned to the category are identified 110. Each identified text string from the training set is processed by one or more horizontal search engines and a predetermined number of URLs are retrieved from the provided result sets 120. In this preferred embodiment, a maximum of 100 URLs are retrieved for each text string. In other embodiments more or fewer URLs may be retrieved. Each retrieved URL is recorded along with its positional rank, starting at 1, in the search engine results set.

In an alternate embodiment URLs that are deemed "noisy" (common across all text strings and all categories) may be excluded. Wikipedia, eBay, Bing, Ask.com, Google, Yahoo, and Amazon are examples of sites with URLs associated with so many categories that they are too noisy to be useful.

In this preferred embodiment each retrieved URL is given a numerical score 130 between 1 and 0, determined by the formula 1−((P−1)/T) where P is the position rank and T is the total number of URLs retrieved. If a set of 100 URLs is retrieved, the first position URL is assigned a score of 1.00, the second 0.99, the third 0.98, etc. The 100th receives a score of 0.01. If a retrieved set of URLs only comprises 10, the first position a score of 1.00, the second 0.90, the third 0.80. Scored URLs are stored in a database 140.

Stored URLs are aggregated and ranked 150 by cumulative position scores. A whitelist for the category is created 160 from the 50 highest scoring URLs, ranked by score, descending. A new category is selected 165 and the process is repeated until a whitelist is created for every category 170.

Figure 2:
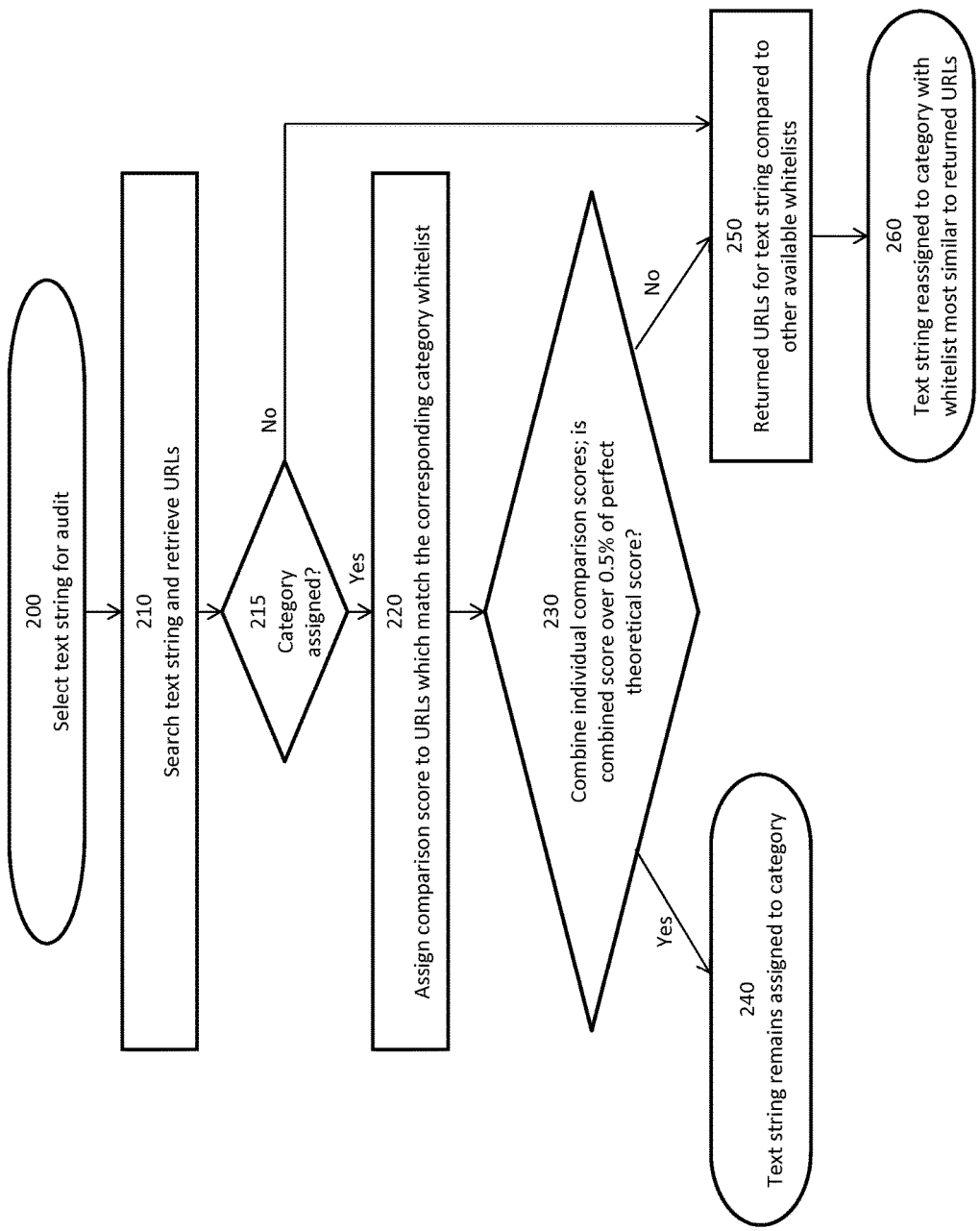
FIG. 2 is a processing flow diagram showing a method for auditing a text string to confirm accuracy of category assignment for text string.

When a whitelist has been created for every category the entire dataset or any portion of the dataset of text strings may be audited for correct categorization. FIG. 2 shows a method for auditing text string categorization.

A text string from the dataset is selected 200 for auditing. The text string is processed by one or more horizontal search engines and URLs are retrieved 210. If the text string has been assigned a category 215, the retrieved text stringURLs are scored 220 against the whitelist URLs for the category according to the similarity in position the search result URLs have to the position of corresponding URLs in the whitelist. A text string URL in the same rank position as the corresponding whitelist URL is given 100% of the whitelist URL's score.

If a text string URL is ranked higher than a corresponding whitelist URL, the text string score the score is decreased by a compounded 5% for each unit of difference in rank position. For example, a text string's URL www.test1.com is in position 5. The corresponding whitelist URL, www.test1.com, is in rank position 8 with a score of 4.00. The text string's URL score becomes 3.43, or ((4*0.95)* 0.95)*0.95, or 4*(0.95^3).

If a text string URL is ranked lower than a corresponding whitelist URL, the text string score is decreased by a compounded 25%. For example, a text string's URL www.test2.com is in position 10. The corresponding whitelist URL, www.test2.com, is in rank position 2 with a score of 20.00. The text string's URL score becomes 2.00, or 20*(0.75^8).

Each text string URL is compared to its corresponding whitelist URL and the text string score are adjusted as described above. Text strings with cumulative URL scores below a chosen threshold of similarity to the corresponding whitelist score are flagged 230 as incorrectly classified. Any suitable threshold of similarity may be selected. In this preferred embodiment a minimum threshold value of 0.5% of the "perfect" URL whitelist score is selected.

A text string with an adjusted cumulative score at or exceeding the selected threshold value remains assigned 240 to the same category. The returned URLs for a text string with an adjusted cumulative score below the selected threshold value are compared 250 to whitelist URLs for other categories using the same auditing process until the category having the most similar whitelist URLs is identified and the text string is reassigned 260 to a new category. Scores of multiple potential new categories may be compared against each other to break ties in instances where more than one category's whitelist shows a high degree of overlap with text string URLs.

Once whitelists have been created and audited for every category, unknown and unclassified text strings may be processed and assigned to categories. Referring again to FIG. 2, a new text string is selected 200 for auditing. The text string is processed by one or more horizontal search engines and URLs are retrieved 210. If the text string has not been assigned a category 215 the returned URLs for the text string are compared 250 to whitelist URLs for each category using the same auditing process until the category having the most similar whitelist URLs is identified and the text string is assigned 260 to a category.

For example, in the category "bow tie" the dataset would include http://www.bowtieclub.com/ and http://www.bowties.com/. A search for "bow tie pasta" may return URLs such as www.cooks.com/rec/search/0,1-0,bow_tie_pasta,FF.html and allrecipes.com/recipe/bowtie-pasta/. The URLs in the search results will have a high match rate to the URLs for the category "pasta" but a low match rate to the URLs and the list of URLs for the category "bow tie", causing the text string to be placed in the "pasta" category.

The entire method may be repeated periodically or as needed to accommodate additions, deletions, or modifications in categories, changes in text string meanings, changes in search engine algorithms, and other changes in the content and function of the internet.

The method described above may be implemented on a general-purpose computer or a computer network as known in the art. Client computer and server computers provide processing, storage, and input/output devices executing application programs. Computer can be linked through communications networks to other computing devices. A communications network can be part of a remote access network, the Internet, a local area or wide area networks.

Each computer contains system bus comprising a set of lines used for data transfer among the components of a computer or processing system, connecting a processor, disk storage, memory, input/output ports, network ports, and other system elements. An Input/Output (I/O) device interface connects various input and output devices such as a keyboard, mouse, monitor, printer, and speakers to the computer. A network interface connects the computer to various other devices attached to a network. Random access memory provides volatile storage for computer software instructions and data used to implement the embodiments described above. Disk storage provides non-volatile storage for computer software instructions and data used to implement the embodiments described above. A central processor unit attached to the system bus executes of computer instructions.

Processor routines and data may be read from and written to computer readable mediums such as DVD-ROM's, CD-ROM's, diskettes, tapes, hard drives that provide at least portions of the software instructions for the system. Computer programs can be installed by any suitable software installation procedure, as is well known in the art. Alternatively, at least a portion of the software instructions may also be downloaded over a cable, communication and/or wireless connection.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

I claim:

1. A computer-implemented method for categorizing text strings, comprising the steps of:
    creating topical categories;
    creating vocabulary rules;
    inputting text strings to system memory;
    assigning the text strings to the topical categories with the vocabulary rules;
    processing each text string assigned to each category with at least one internet search engine to retrieve a set of ranked uniform resource locators;
    assigning a numerical score to each ranked uniform resource locator retrieved for each text string for each category;
    creating a whitelist of uniform resource locators retrieved for each text string for a first category, the uniform resource locators ranked by the numerical scores of the text strings assigned to the first category;
    repeating the step of creating a whitelist of uniform resource locators for a each additional category until a whitelist is created for every category; and
    auditing each text string by processing each text string with at least one internet search engine to retrieve an audit set of ranked uniform resource locators, comparing the positional rank of each uniform resource locator in the audit set to the positional rank of the same uniform resource locator in the whitelist for the category to which the audited text string is assigned, and reassigning to a new category each text string having a positional rank that differs from the positional rank of the same uniform resource locator in the whitelist for the category to which the audited text string is assigned by more than a threshold amount.

* * * * *